(12) United States Patent
Campbell

(10) Patent No.: US 6,923,913 B2
(45) Date of Patent: Aug. 2, 2005

(54) SEAWEED-BASED PRODUCT FOR TREATING LIQUID WASTE, TOGETHER WITH METHOD FOR MAKING AND USING THE SEAWEED-BASED PRODUCT

(76) Inventor: William E. Campbell, 5112 Midyette Ave., Morehead City, NC (US) 28557

( * ) Notice: Subject to any disclaimer, the term of this patent is extended or adjusted under 35 U.S.C. 154(b) by 75 days.

(21) Appl. No.: 10/631,616

(22) Filed: Jul. 31, 2003

(65) Prior Publication Data

US 2005/0023214 A1 Feb. 3, 2005

(51) Int. Cl.$^7$ .................................................. C02F 3/32
(52) U.S. Cl. ........................ 210/602; 210/631; 210/903; 210/906; 252/181
(58) Field of Search ................................ 210/602, 610, 210/631, 903, 906, 908, 611; 252/180, 181

(56) References Cited

U.S. PATENT DOCUMENTS

| | | | |
|---|---|---|---|
| 3,711,392 A | * | 1/1973 | Metzger ..................... 210/603 |
| 4,415,450 A | | 11/1983 | Wolverton .................. 210/602 |
| 4,565,635 A | * | 1/1986 | Le Du et al. ............... 210/727 |
| 4,933,087 A | * | 6/1990 | Markham et al. ........... 210/626 |
| 5,201,930 A | | 4/1993 | Campbell ...................... 71/23 |
| 5,350,588 A | | 9/1994 | Campbell .................... 426/431 |
| 5,770,436 A | * | 6/1998 | Mayfield ................. 435/262.5 |
| 6,365,384 B1 | * | 4/2002 | Iijima ........................ 435/174 |
| 6,503,544 B2 | * | 1/2003 | Nagai et al. .................. 426/53 |
| 6,641,740 B2 | * | 11/2003 | Cornelius et al. ........... 210/698 |

FOREIGN PATENT DOCUMENTS

JP          3-131393          *  6/1994

* cited by examiner

*Primary Examiner*—Fred G. Prince
(74) *Attorney, Agent, or Firm*—Andrew T. Prokopetz (57) ABSTRACT

A wastewater treatment product prepared from seaweed and a process for the treatment of wastewater. In a first step, seaweed is mixed with a preservative, micro-nutrient, oxygen-containing, and antifungal component. In the second step, the product of the first step is then mixed with a humic acid additive along with an oxygen-based component and a lactobacillus/aloe component to achieve the final product. This final product is then spread over the surface of the wastewater in sufficient quantities to see a reduction in the BOD, TSS, ammonia, and phosphorus, while at the time minimizing the amount of sludge removal.

22 Claims, 10 Drawing Sheets

---

Seaweed - Ascophyllum nodusum or Sargassum Natan or Sargassum Fluitan 1 lb. Seaweed to 22-176 lb/H$_2$O 80° F for several days and then increase the temperature to 150° F 3-7 days total at constant blending/agitation

↓

Filter
60-mesh shaker screen

↓

Add 1000-gallons of extract to Blend tank

↓

1$^{st}$ Blend Tank

First Stage - Step 1

FIGURE 1A
First Stage - Step 1

FIGURE 1B
First Stage - Step 2

FIGURE 1C
First Stage - Step 3

FIGURE 1D
First Stage - Step 4

FIGURE 1E
First Stage - Step 5

FIGURE 1F
First Stage - Step 6

FIGURE 2A
Second Stage - Step 1

FIGURE 2B
Second Stage - Step 2

FIGURE 2C
Second Stage - Step 3

FIGURE 2D
Second Stage - Step 4

SEAWEED-BASED PRODUCT FOR TREATING LIQUID WASTE, TOGETHER WITH METHOD FOR MAKING AND USING THE SEAWEED-BASED PRODUCT

BACKGROUND OF THE INVENTION

The invention relates to a seaweed-based product for improving the quality of liquid waste, such as is found in municipal sewer systems, Publicly Owned Treatment Works (POTW), hog farm lagoons and the like, and to methods of making and using the product so as to reduce the odor and solids associated with the waste as well as reduce other undesirable characteristics.

Extremely large quantities of wastewater containing animal and/or human waste are treated daily, and as a consequence of such treatment byproducts in the form of solids or sludge and liquids also accrue in large quantities and must be disposed of. Improvements in treatment are needed for the purpose of reducing the solids, reducing the odor of what remains, reducing the Biological Oxygen Demand (BOD); the Total Suspended Solids (TSS); reducing the ammonia, and reducing the phosphorous. Since wastewater treatment of any kind is typically done in conjunction with use of digesters and drying beds, the effect of the treatment may affect the amount of sludge handling required and thus the amount of sludge handling associated with a particular form of treatment becomes an important consideration. One object of the invention herein is thus to provide a method of treating liquid waste, which results in a decrease in the BOD, TSS, ammonia and phosphorus, while at the same time minimizing the amount of sludge removal.

Various United States Patents are related to ways of treating wastewater with plant materials. For example, U.S. Pat. No. 4,415,450 is directed to treating wastewater with microorganisms and roots of an aquatic plant. Since the product of the present invention makes use of seaweed as a component of a liquid waste treating product, reference is also made to Applicant's U.S. Pat. No. 5,350,588, which describes use of seaweed as a component of an animal feed and water additive and to U.S. Pat. No. 5,201,930, which describes a plant stimulant product made from seaweed. It is a further object of this invention to provide a reproducible method of producing a seaweed-based product that can be used to treat liquid waste. Other objects will become apparent as the description proceeds.

SUMMARY OF THE INVENTION

A product useful for treating wastewater containing human and/or fecal material removes or reduces the volume of certain characteristics and contaminants such as, but not limited to, Biological Oxygen Demand (BOD), Total Suspended Solids (TSS), ammonia, and phosphorus, and is both made and used in a unique way. Making of the product is done in two stages. In a first stage, a quantity of seaweed of either the ascophyllum nodusum, sargassum natan, or sargassum fluitan variety is heated and agitated over a period of several days and after being filtered is added to a first blend tank, to which is also added in a consecutive sequence (a) a quantity of a preservative formaldehyde solution agitated over several hours with the seaweed, (b) a quantity of micro-nutrients agitated over several hours with the previously-introduced contents in the first blend tank, (c) a quantity of an oxygen-based mixture agitated over several hours and then dripped into the first blend tank containing the previously-introduced contents, and (d) a quantity of anti-fungal mixture added to the previously-introduced contents in the first blend tank. To complete the first stage of making the product, the contents of the first blend tank are poured into containers, e.g., fifty five- (55-) gallon drums, and stored for use in the second stage of making the product.

The second stage of making the product, according to an illustrative embodiment, involves in a first step adding 333⅓ gallons of the seaweed/preservative/micro-nutrient/antifungal base produced in the first stage to a second blend tank. Next 333⅓ gallons of a humic acid additive mixture is added to the second blend tank, wherein said mixture is made up of peat and water which has been heated and agitated for twenty-four (24) hours, to which is added a quantity of an aerobic and facultative bacteria agitated over a period of hours with an anti-fungal mixture extracted through a shaker screen. To the previously mentioned seaweed-humic acid-bacteria mixture in the second blend tank is next added 333⅓ gallons of an oxygen-based mixture consisting of distilled water, hydrogen peroxide, and potassium stannate. Lastly, about fifty (50) gallons of a component referred to as the "lacto/aloe component" and made up of lactobacillus acidophilus (concentrated) and aloe concentrate is added to the second blend tank, which after being thoroughly mixed completes production of the product of the invention.

This seaweed-based product is then used in sufficient quantities for the treatment of the water quality in wastewater lagoons, Publicly Owned Treatment Works (POTW), and other such lagoons such as found on hog farms. The seaweed-based product is added to the wastewater in sufficient quantities to provide for a decrease in the Biological Oxygen Demand (BOD), Total Suspended Solids (TSS) and other improvements in the quality of the water such as a decrease in the ammonia and total phosphorus content. In addition a reduction in the dry tons of sludge may also be an advantage of using this seaweed-based product for the treatment of wastewater.

DETAILED DESCRIPTION

The seaweed extraction steps, the identity and amount of components added to the seaweed extract, and the length of time of each agitation, cooling or warming step, have been developed over a period of time, with the final product as disclosed herein being the end result of considerable experimentation and many intermediate less effective products of differing composition and resulting from different preparation steps.

Figure 1A:
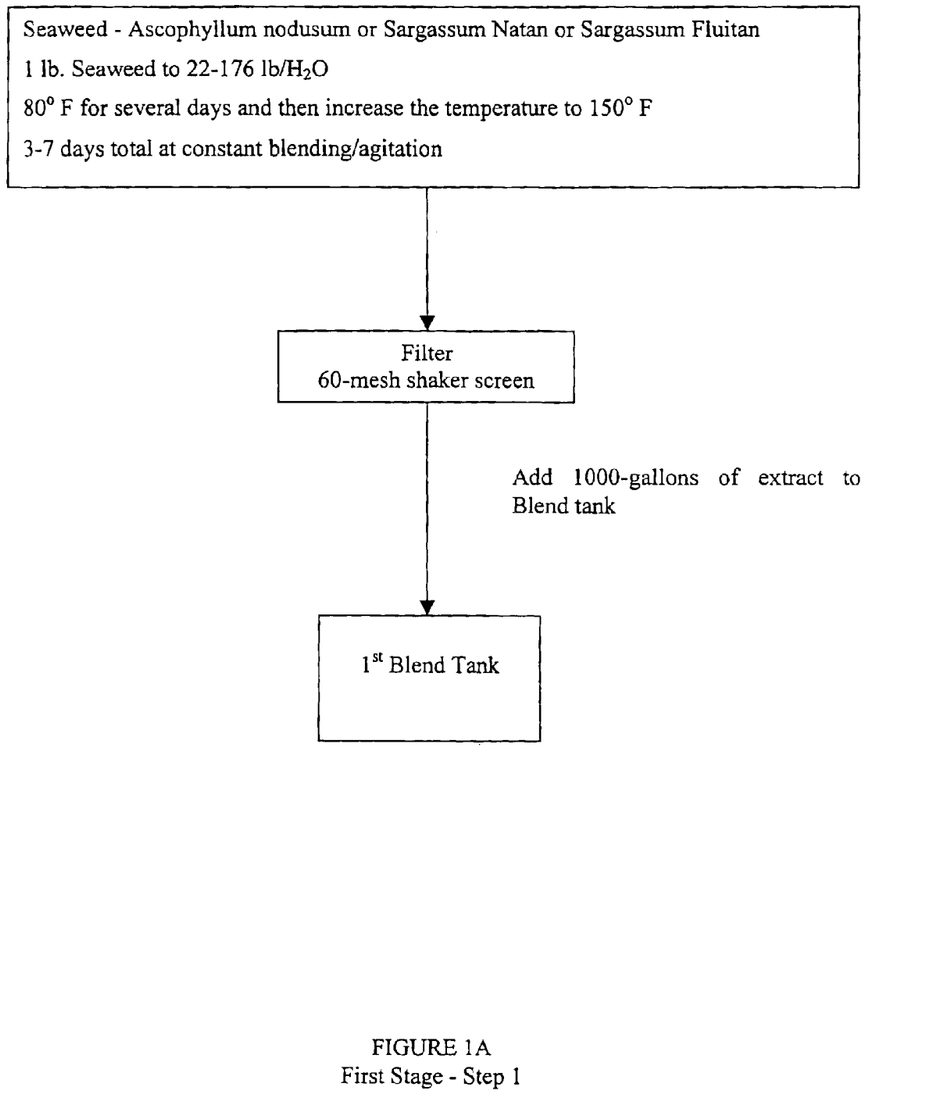
FIGS. 1A–1F are diagrams illustrating the first stage of producing the product of the invention.
Figure 1B:
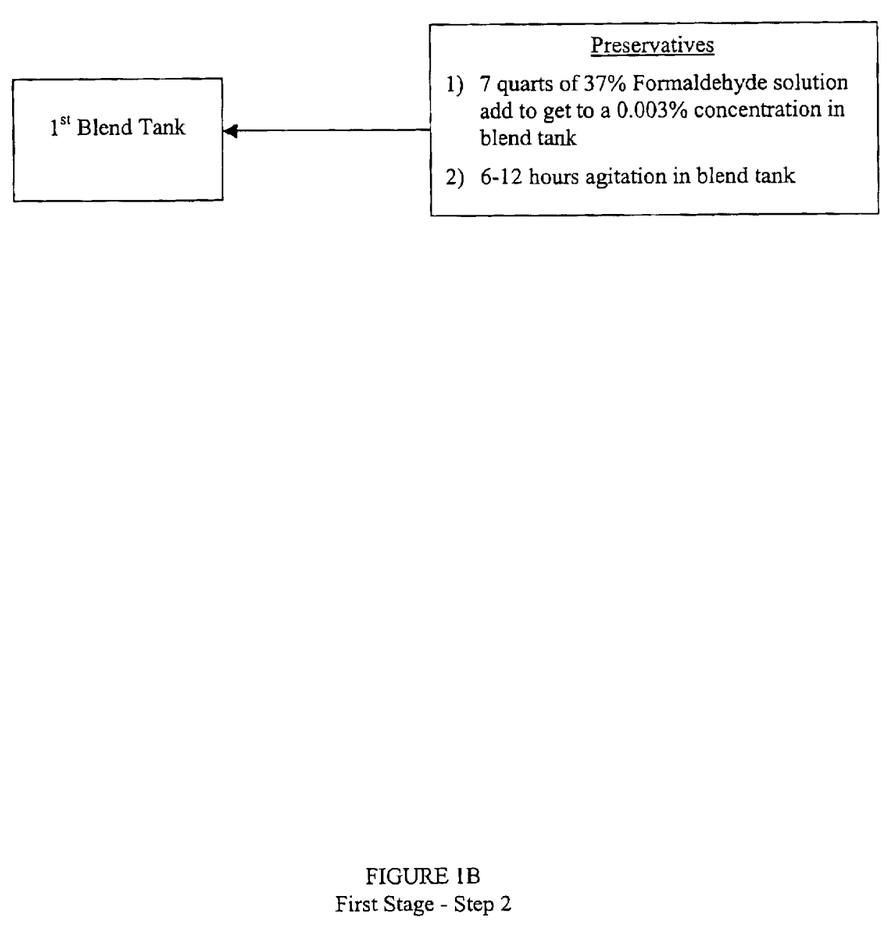
Figure 1C:
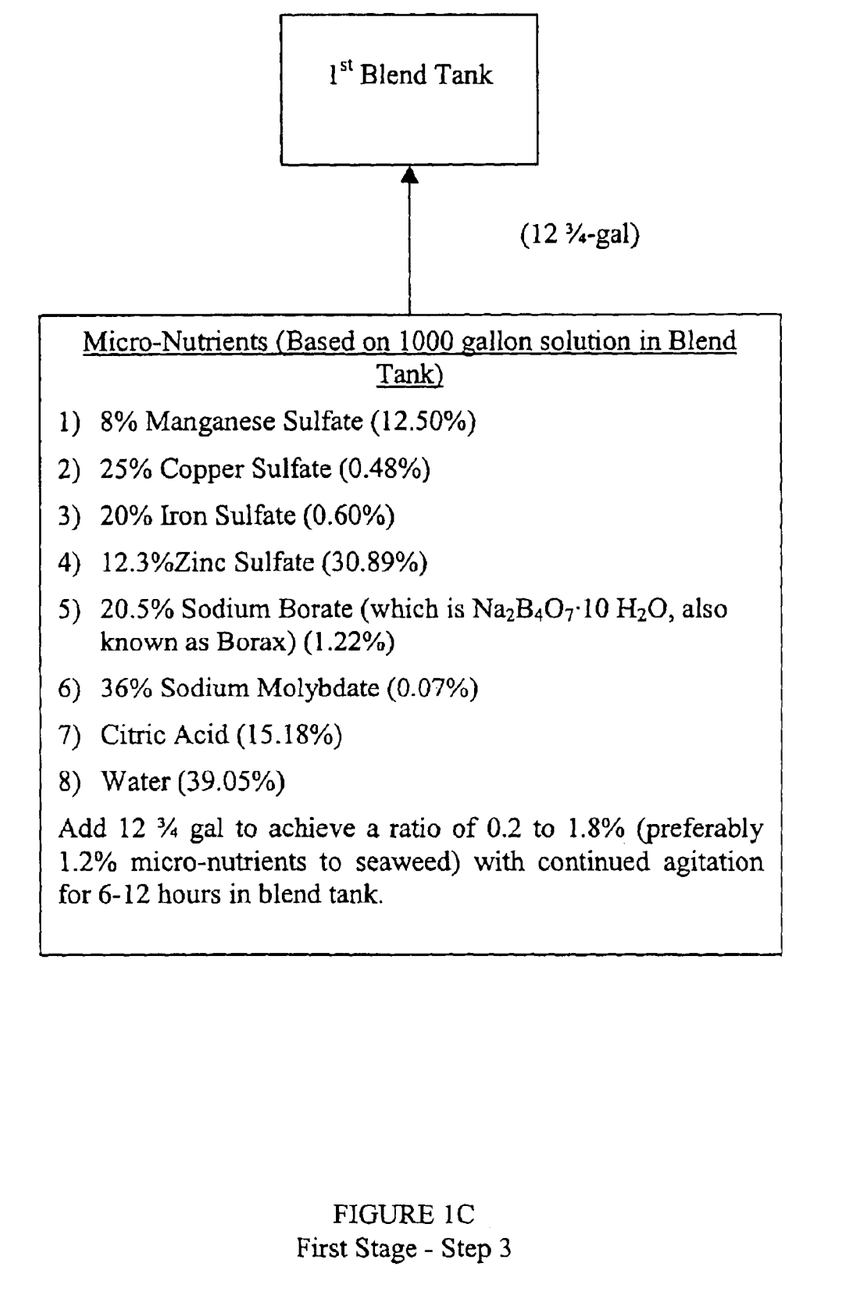
Figure 1D:
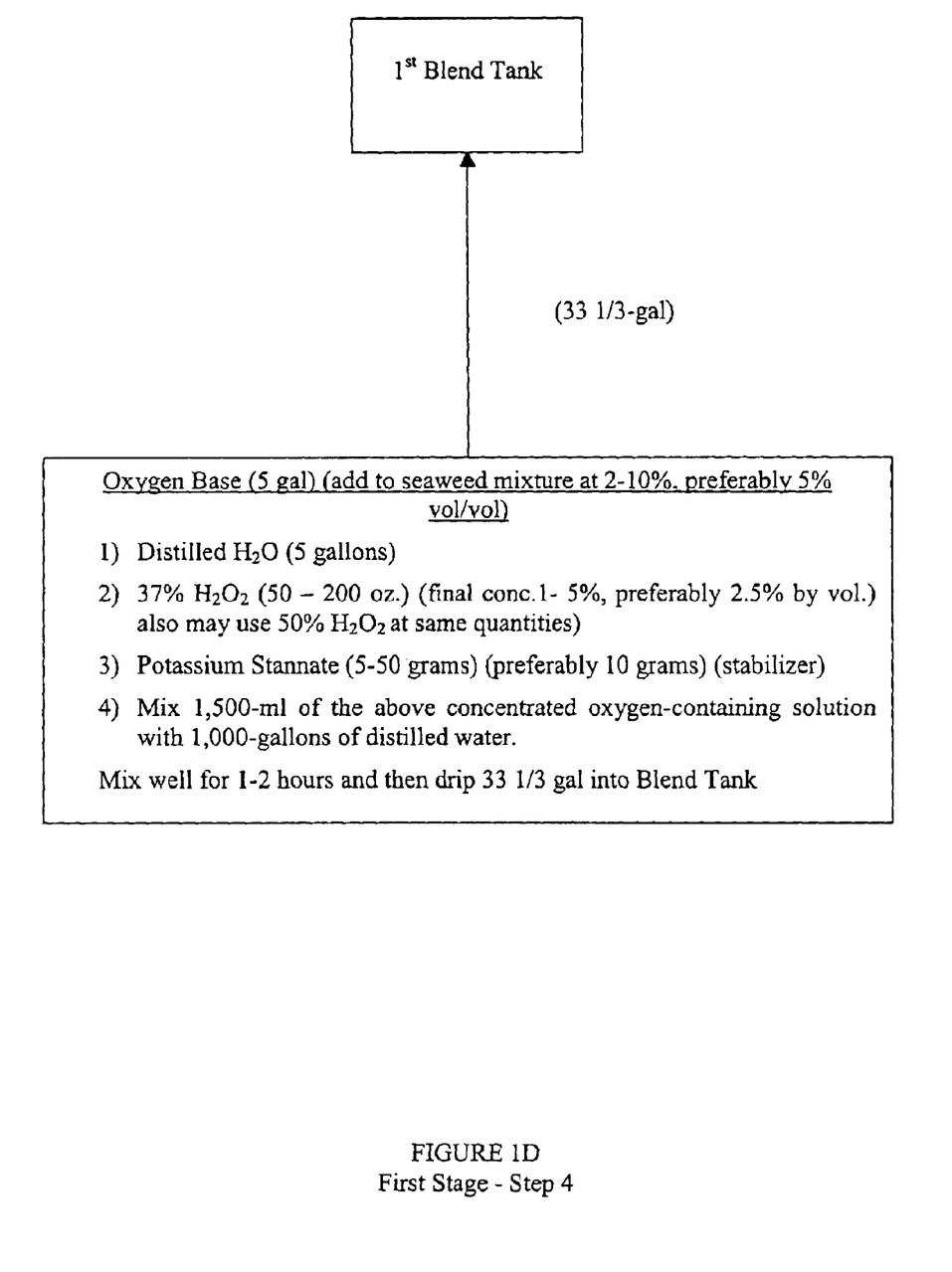
Figure 1E:
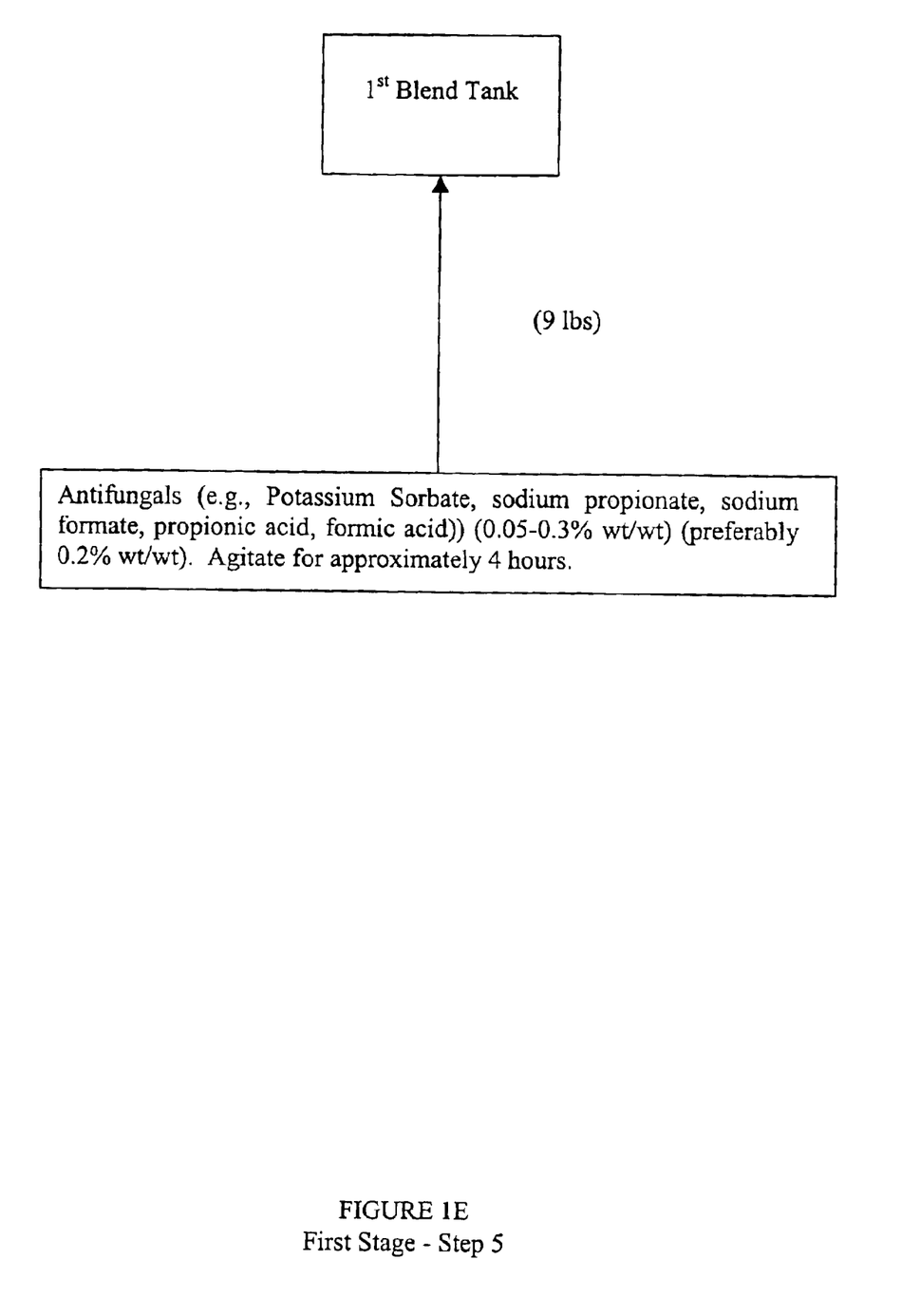
Figure 1F:
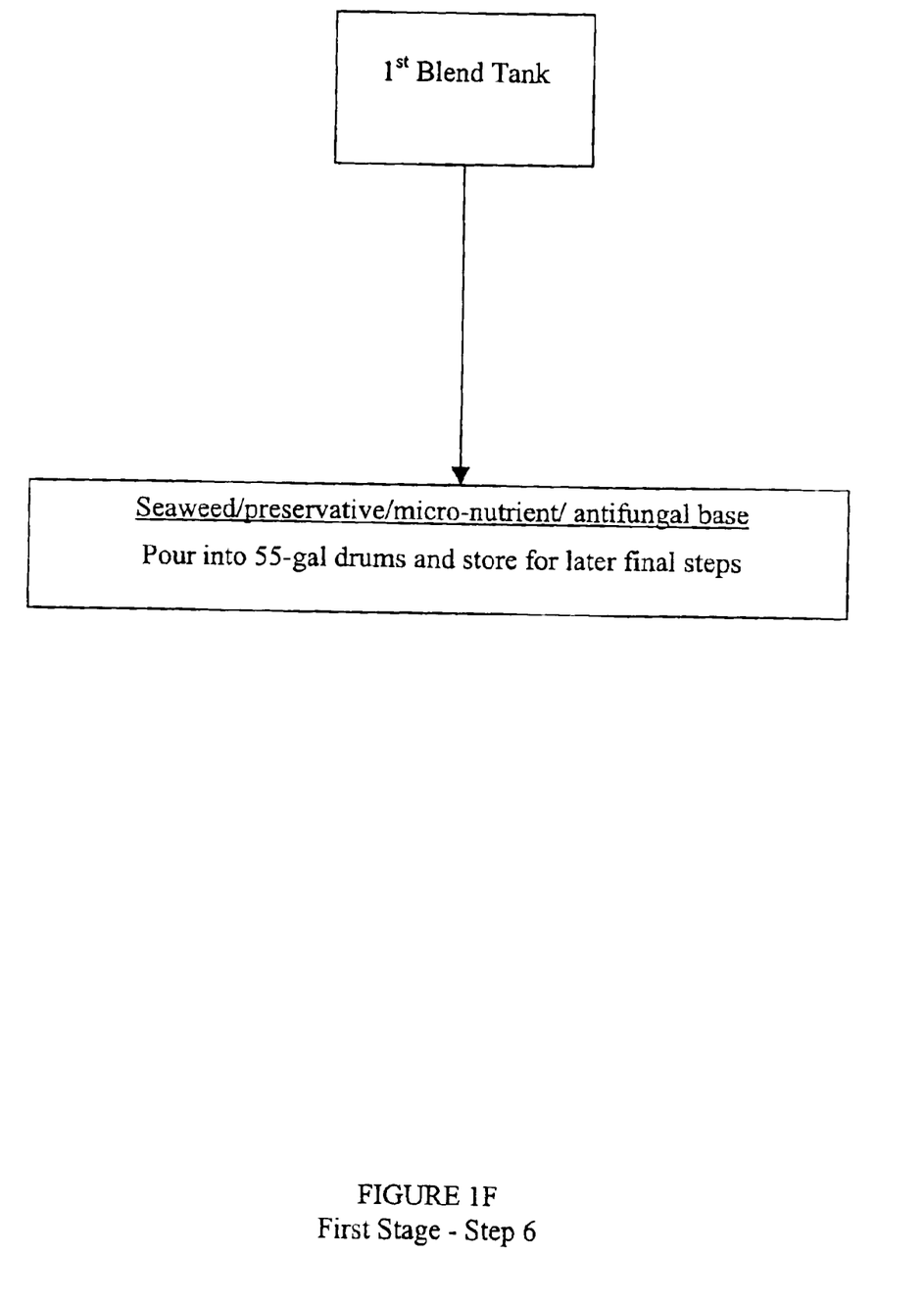

It is important that the water used in preparing the product be distilled water so undesirable elements or contents from tap water are not added to the product to interfere or decrease its wastewater treatment effects. The product of the invention is made according to the following steps:

The first stage in the process of making a seaweed-containing material, and as illustrated in the schematic diagrams of the process of the invention in FIGS. 1A–1F, comprising the steps of:

a. Adding 1,000 gallons of a liquid extract of seaweed to a blend tank, wherein said liquid extract is prepared comprising the steps of: (i) drying the seaweed with a heat source; (ii) mixing the dried seaweed in distilled water in a ratio of 1 pound of dried seaweed to about 22–176 pounds of distilled water (wt/wt); (iii) heating the seaweed-water mixture to between 80 degrees to 150 degrees Fahrenheit for a period of from 4 to 7 days; (iv) filtering off the solids through a 60-mesh shaker screen to obtain said liquid extract;

b. Adding approximately 7 quarts of a 37% formaldehyde solution to the blend tank to obtain a concentration of 0.1% (wt/wt) with the blend tank mixture. The formaldehyde in such quantities acts as a preservative;

c. Agitating the liquid extract-formaldehyde mixture for a period of approximately 6 to 12 hours;

d. Adding 12¾ gallons of a micronutrient-based component in a water solution to the blending tank, wherein said micronutrient component is prepared consisting of the following nutrients in the ratios indicated in parentheses: 8% manganese sulfate (12.50%); 25% copper sulfate (0.48%); 20% iron sulfate (0.60%); 12.3% zinc sulfate (30.89%); 20.5% sodium borate (1.22%); 36% sodium molybdate (0.07%); and citric acid (15.18%) in water (39.05%), wherein said nutrients are at a concentration of 0.2% to 1.8% (nutrients/seaweed mixture) (wt/wt), preferably at 1.2% (wt/wt);

e. Agitating the seaweed mixture for a period of from 6 to 12 hours;

f. Adding in a drip-wise manner, 33⅓-gallons of an oxygen-containing component to the blend tank to achieve a concentration of 2–10% (vol/vol), preferably 5% (vol/vol) with the seaweed mixture, wherein said oxygen containing component is prepared comprising the steps of: (i) adding 5 gallons of distilled water to a container; (ii) adding 50 to 200 ounces of a 37% hydrogen peroxide solution into the distilled water to achieve a final concentration of 1.0 to 5.0% (vol/vol), preferably 2.5% (vol/vol); (iii) adding 5.0 to 50.0 grams, preferably 10.0 grams, of potassium stannate as a stabilizer into the water-peroxide solution; (iv) adding approximately 1,500 ml. of the above concentrated oxygen-containing mixture to approximately 1,000 gallons of distilled water to achieve in the preferred embodiment a final solution of the oxygen-containing component with a concentration of 20 ppm dissolved oxygen;

g. Agitating said seaweed mixture for approximately 1 to 2 hours;

h. Adding 9 pounds of an antifungal compound selected from the group consisting of potassium sorbate, sodium propionate, sodium formate, propionic acid, and formic acid to achieve a concentration of between 0.05% to 0.30% (wt/wt), preferably 0.20% (wt/wt);

i. Agitating the mixture in the blend tank of all the preceding components for a period of about 4 hours; and j. Transferring the seaweed mixture from steps (a)–(i) into 55-gallon drums for storage and use in the next phase of making the seaweed-based product.

Figure 2A:
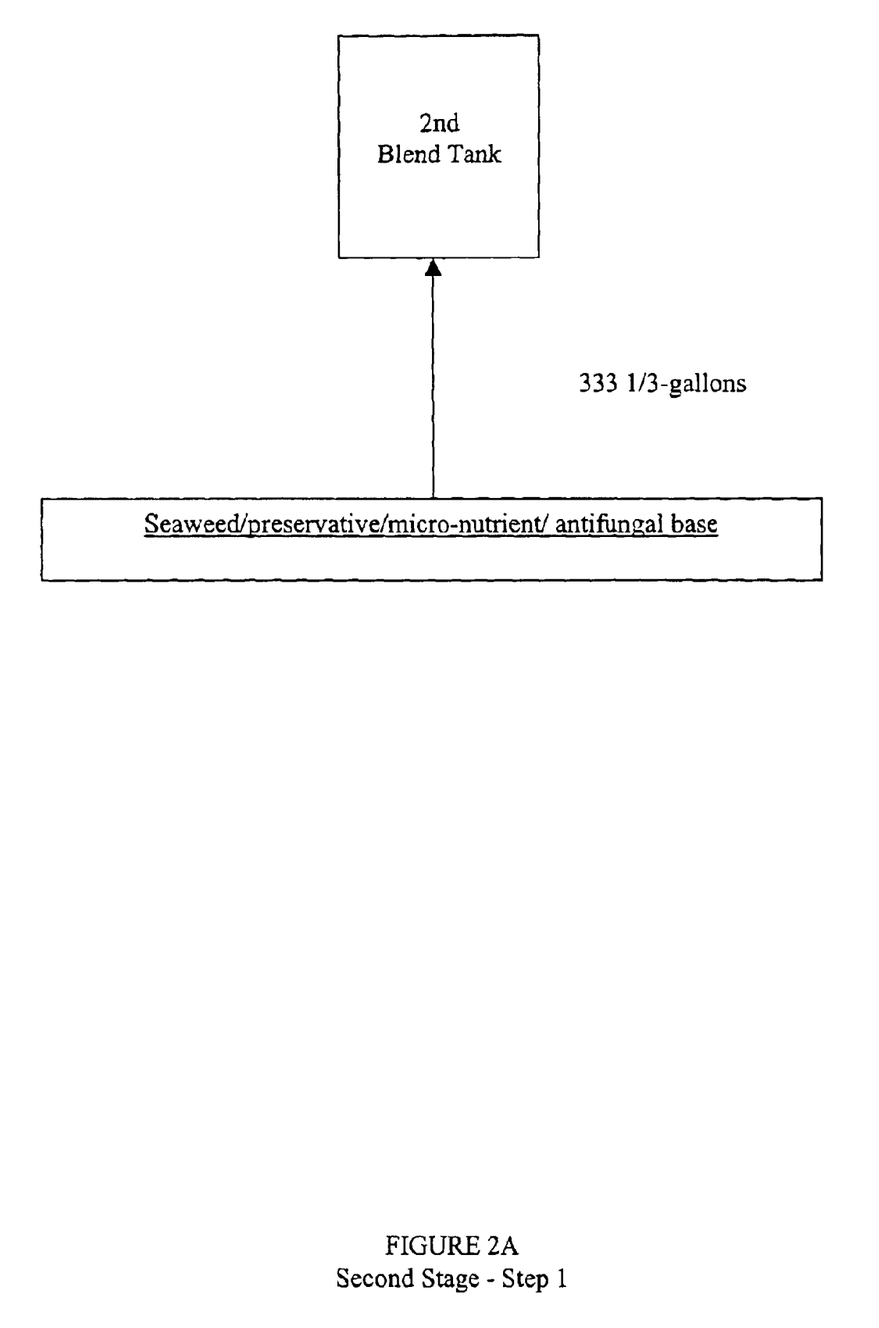
FIGS. 2A–2D are diagrams illustrating the second stage of producing the product of the invention.
Figure 2B:
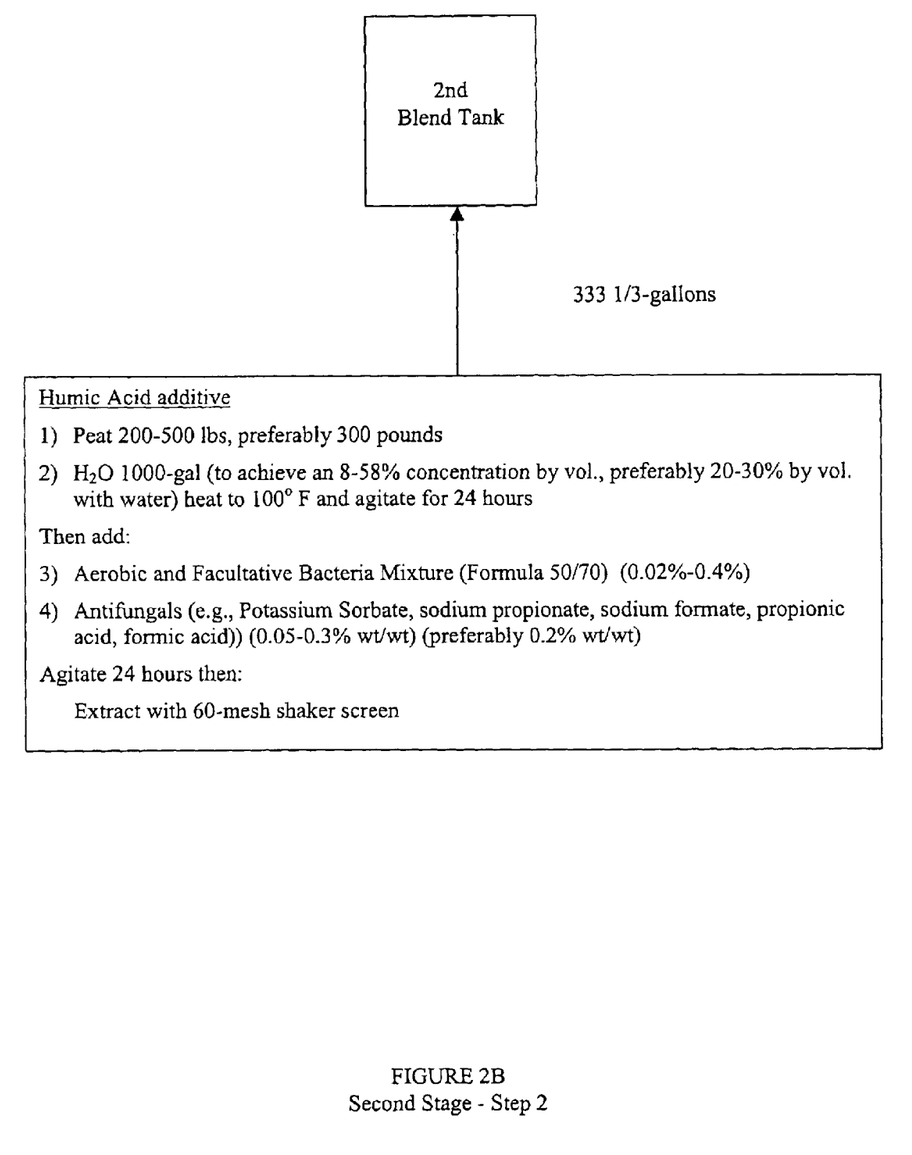
Figure 2C:
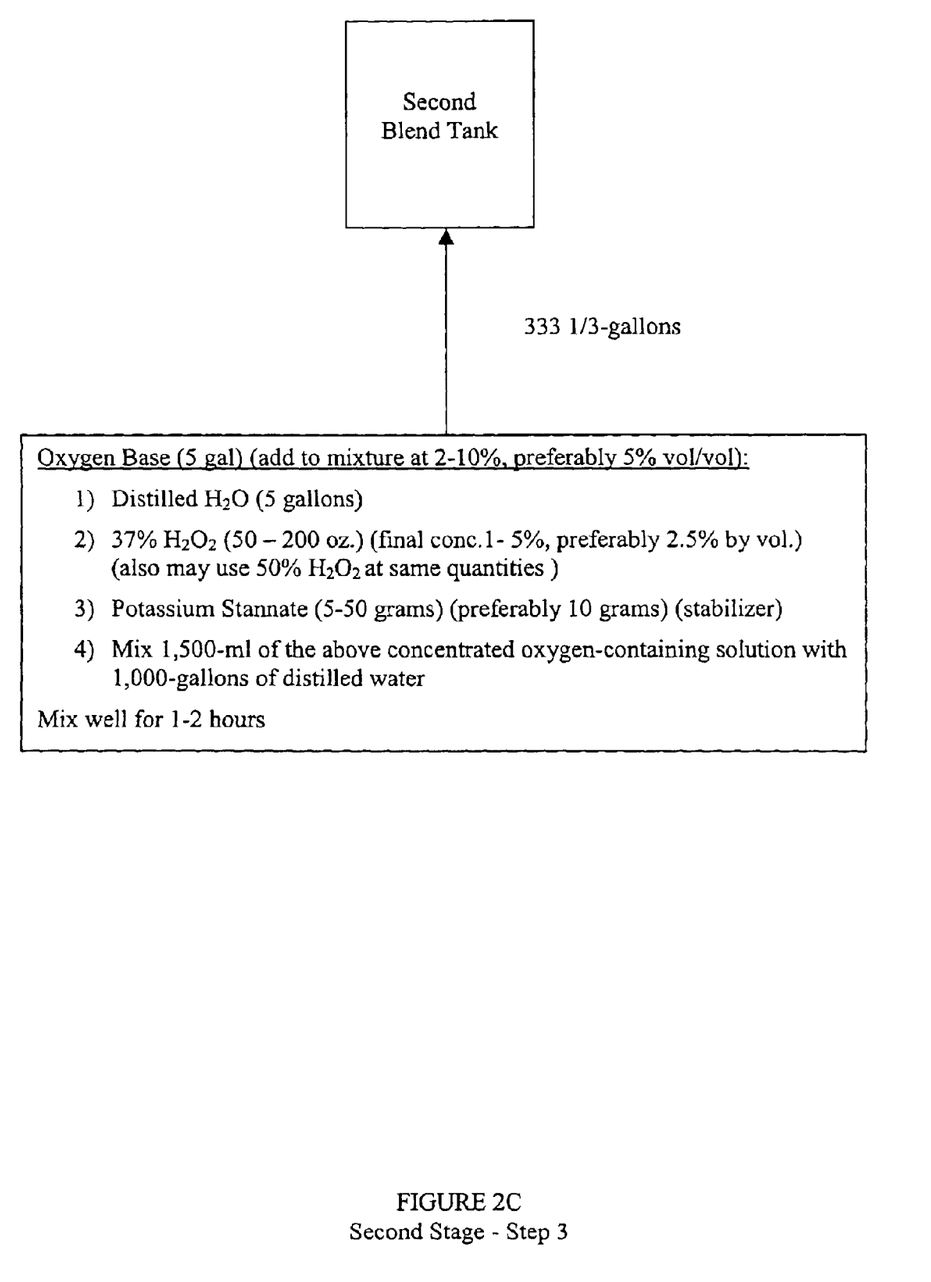
Figure 2D:
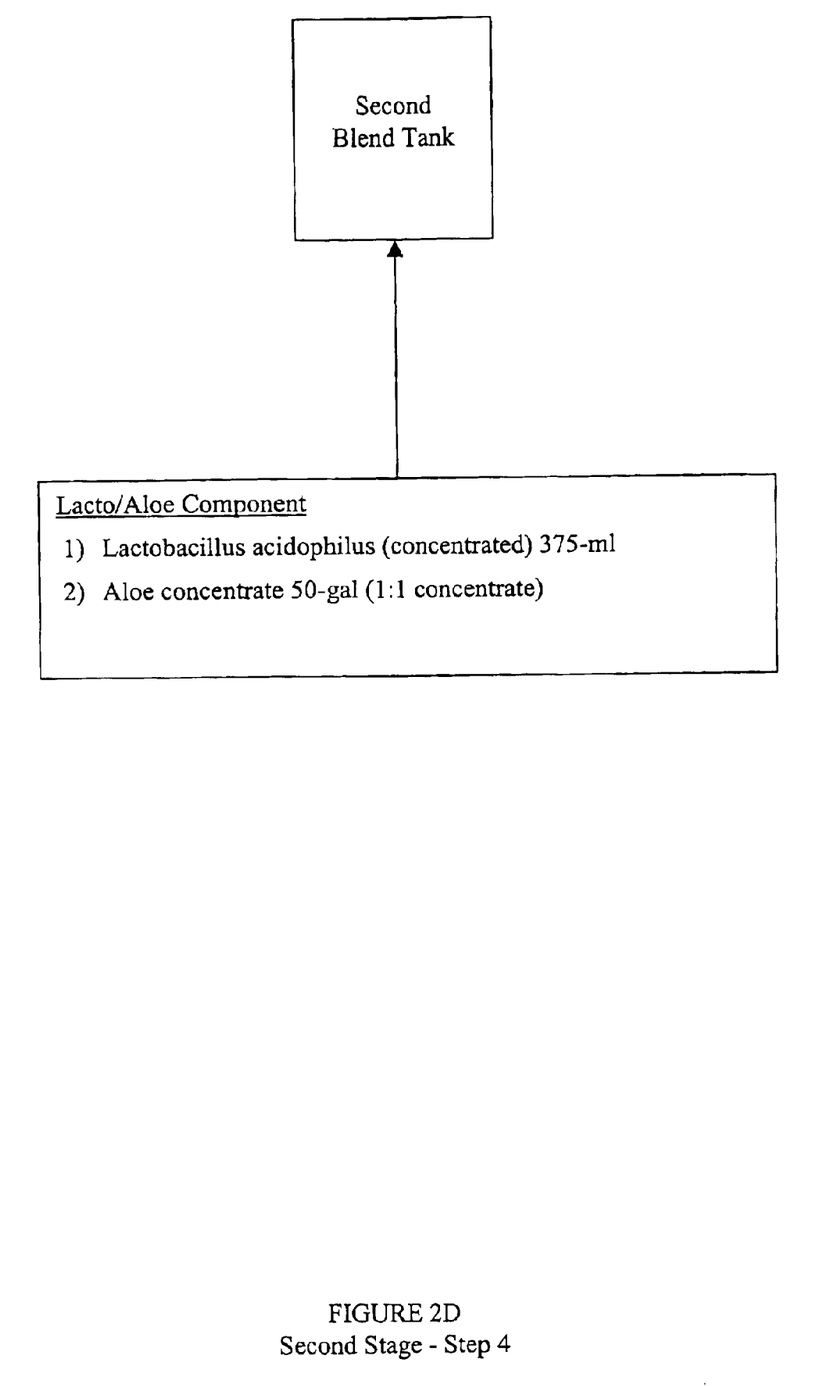

The second stage in the process of making a seaweed-containing material, and as illustrated in the schematic diagrams of the process of the invention in FIGS. 2A–2D, comprising the steps of:

a. In the second stage of the making of the seaweed-based product, and as illustrated in the schematic diagram of the process of the invention in FIG. 2, transferring 333⅓ gallons of the seaweed mixture from steps (a)–(i) into a second blend tank;

b. Adding 333⅓ gallons of a liquid extract of a humic acid mixture to the second blend tank prepared by the process comprising the steps of: (i) adding 200 to 500 pounds, preferably 300 pounds, of commercially-obtainable peat in a tank; (ii) adding 1,000 gallons of distilled water to the tank to achieve a concentration of between 8.0 to 58.0% of humic acid, preferably a 20.0% to 30.0% concentration; (iii) heating the tank to 100° F.; (iv) agitating the mixture for a 24-hour period; (v) adding a bacteria-containing component comprising a mixture of aerobic and facultative bacteria to achieve a concentration of between 0.02% to 0.40%; (vi) adding an antifungal selected from the group consisting of potassium sorbate, sodium propionate, sodium formate, propionic acid, and formic acid to achieve a concentration of between 0.05% to 0.30% (wt/wt), preferably 0.20% (wt/wt); (vii) agitating the mixture at 100° F. for 24 hours; and (viii) extracting the mixture through a 60-mesh shaker screen;

c. Adding 333⅓ gallons of an oxygen-containing component obtained by the process in step 1f above; and d. Adding a lactobacillus/aloe mixture consisting of 125 ml of a concentrated solution of lactobacillus acidophilus, 50 gallons of a 1:1 concentrate of aloe and an antifungal compound selected from the group consisting of potassium sorbate, sodium propionate, sodium formate, propionic acid, and formic acid to achieve a concentration of between 0.05% to 0.30% (wt/wt), preferably 0.20% (wt/wt).

Applicant has deposited with the ARS Patent Culture Collection in Peoria, Ill. the bacteria-containing component comprising a mixture of aerobic and facultative bacteria identified in the second stage step (b)(v). The deposit date is Jul. 30, 2003 and the identification number is NRRL B-30684. This bacteria-containing component is a mixture of Formula 50 and Formula 70 from John L. Biesz, located at 132 Springhouse Road, Allentown, Pa. 18104, Telephone 610-398-9317 and fax 610-398-9317. In Biesz's catalog, Biesz identifies Formula 50 for use with food and beverage wastewater treatment as well as municipal and domestic wastewaters. Biesz identifies Formula 70 for use in barn drain systems and animal waste pits.

A typical use of the product can be described as follows: spreading the seaweed-based product over the surface of the wastewater in sufficient quantities to see a reduction in the BOD, TSS, ammonia, and phosphorus, while at the same time minimizing the amount of sludge removal. In a preferred embodiment, every four weeks incorporate the seaweed-based product at the rate of one gallon per 100,000-gallons per day of wastewater processed.

I claim:

1. A process of making a wastewater treating seaweed-containing liquid composition by the steps comprising:

a. Adding to a first blend tank a first reference quantity of about 1,000-gallons, of a liquid extract of seaweed of a kind selected from the group consisting of *Ascophyllum-nodusum, Sargassum natan,* and *Sargassum fluitan* and prepared by the steps comprising: (i) drying the seaweed with a heat source; (ii) mixing the dried seaweed in distilled water in a ratio of 1 pound of dried seaweed to about 22–176 pounds of distilled water (wt/wt); (iii) heating the seaweed-water mixture to between 80 degrees to 150 degrees Fahrenheit for a period of from 4 to 7 days; and (iv) filtering off the solids to obtain said first quantity of liquid extract;

b. Adding to said first quantity in said first blend tank about 7 quarts of a 37% formaldehyde solution to obtain a concentration of 0.1% (wt/wt) in said first quantity liquid extract-formaldehyde mixture;

c. Agitating said liquid extract-formaldehyde mixture for a period of approximately 6 to 12 hours;

d. Adding to said first blend tank about 12¾-gallons of a micro-nutrient based component consisting of the following nutrients in the ratios indicated in parentheses, 8% manganese sulfate (12.50%), 25% copper sulfate (0.48%), 20% iron sulfate (0.60%), 12.3% zinc sulfate (30.89%), 20.5% sodium borate (1.22%), 36% sodium molybdate (0.07%), citric acid (15.18%) and water (39.05%), wherein said nutrients are at a concentration of 0.2% to 1.8% (nutrients/liquid extract-formaldehyde mixture) (wt/wt);

e. Agitating the liquid extract-formaldehyde-nutrient mixture for a period of from 6 to 12 hours;

f. Adding to the contents of said first blend tank about 33⅓-gallons of an oxygen-containing component to achieve a concentration of 2–10% (vol/vol) with the liquid extract-formaldehyde-nutrient mixture, wherein said oxygen containing component being prepared by the steps of: (i) adding about 5-gallons of distilled water to a container; (ii) adding 50 to 200 oz. of a 37% hydrogen peroxide solution into the distilled water to achieve a final concentration of 1.0 to 5.0% (vol/vol); (iii) adding about 5.0 to 50.0 grams, of potassium stannate as a stabilizer into the water-peroxide solution; (iv) adding about 1,500-ml of the above concentrated oxygen-containing mixture to 1,000-gal of distilled water to achieve a final solution of the oxygen-containing component with a concentration of about 20 ppm dissolved oxygen;

g. Agitating the then existing mixture in the first blend tank for approximately 1 to 2 hours;

h. Adding to the first blend tank about 9-pounds of an antifungal compound selected from the group consisting of potassium sorbate, sodium propionate, sodium formate, propionic acid, and formic acid to achieve a concentration of between 0.05% to 0.30% (wt/wt);

i. Agitating the then existing mixture in the first blend tank for a period of about 4 hours;

j. Transferring about 333⅓-gallons of said then existing mixture from steps a–i into a second blend tank;

k. Adding about 333⅓-gallons of a liquid extract of a peat-bacteria-antifungal mixture to the second blend tank prepared by the process comprising the steps of (i) adding about 200 to 500-pounds of peat in a preparation tank; (ii) adding about 1,000-gallons of water to the preparation tank to achieve a concentration of between 8.0 to 58.0% of humic acid; (iii) heating the contents of said preparation tank to about 100° F.; (iv) agitating the peat mixture in said preparation tank for a period of about 24 hours; (v) adding a bacteria-containing component comprising a mixture of aerobic and facultative bacteria to achieve a concentration of between 0.02% to 0.40% bacteria concentration; (vi) adding an antifungal compound selected from the group consisting of potassium sorbate, sodium propionate, sodium formate, propionic acid, and formic acid to achieve a concentration of between 0.05% to 0.30% (wt/wt) of the antifungal compound to the peat-bacteria mixture; (vii) agitating the peat-bacteria-antifungal mixture at about 100° F. for about 24 hours; and (viii) extracting the peat-bacteria-antifungal mixture through a 60-mesh shaker screen;

l. Adding to the second blend tank about 333⅓-gallons of an oxygen-containing component obtained by the process in step f above; and m. Adding a lactobacillus/aloe mixture consisting of about 125-ml of a concentrated solution of lactobacillus acidophilus, about 50-gallons of a 1:1 concentrate of aloe and an antifungal compound selected from the group consisting of potassium sorbate, sodium propionate, sodium formate, propionic acid, and formic acid to achieve a concentration of between 0.05% to 0.30% (wt/wt).

2. The process of claim 1 wherein the nutrients of the 12¾-gallons of said micro-nutrient based component are at a concentration of 1.2% (wt/wt).

3. The process of claim 1 wherein the oxygen-containing component is added to achieve a concentration of 5% (vol/vol) with the liquid extract-formaldehyde-nutrient mixture.

4. The process of claim 1 wherein said 37% hydrogen peroxide solution is added to said distilled water to achieve a final concentration of 2.5% (vol/vol).

5. The process of claim 1 wherein 10.0 grams of said potassium stannate is added into said water-peroxide solution.

6. The process of claim 1 wherein said antifungal compound is added to said first blend tank to achieve a concentration of 0.20% (wt/wt).

7. The process of claim 1 wherein said peat-bacteria-antifungal mixture is made by adding 300 pounds of peat to said preparation tank.

8. The process of claim 1 wherein water is added to said preparation tank in the preparation of the peat-bacteria-antifungal mixture so that the concentration of humic acid is between 20.0 to 30.0%.

9. The process of claim 1 wherein the concentration of said antifungal compound is at 0.20% (wt/wt) of the antifungal compound to said peat-bacteria mixture.

10. The process of claim 1 wherein the concentration of said lactobacillus/aloe mixture is at 0.20% (wt/wt).

11. A process of treating wastewater comprising the steps:

a. Preparing a wastewater treating seaweed-containing composition comprising the steps:

i. Adding to a first blend tank a first reference quantity of about 1,000-gallons, of a liquid extract of seaweed of a kind selected from the group consisting of *Ascophyllum nodusum, Sargassum natan,* and *Sargassum fluitan* and prepared by the steps comprising: (i) drying the seaweed with a heat source; (ii) mixing the dried seaweed in distilled water in a ratio of 1 pound of dried seaweed to about 22–176 pounds of distilled water (wt/wt); (iii) heating the seaweed-water mixture to between 80 degrees to 150 degrees Fahrenheit for a period of from 4 to 7 days; and (iv) filtering off the solids to obtain said first quantity of liquid extract;

ii. Adding to said first quantity in said first blend tank about 7 quarts of a 37% formaldehyde solution to obtain a concentration of 0.1% (wt/wt) in said first quantity liquid extract-formaldehyde mixture;

iii. Agitating said liquid extract-formaldehyde mixture for a period of approximately 6 to 12 hours;

iv. Adding to said first blend tank about 12¾-gallons of a micro-nutrient based component consisting of the following nutrients in the ratios indicated in parentheses, 8% manganese sulfate (12.50%), 25% copper sulfate (0.48%), 20% iron sulfate (0.60%), 12.3% zinc sulfate (30.89%), 20.5% sodium borate (1.22%), 36% sodium molybdate (0.07%), citric acid (15.18%) and water (39.05%), wherein said nutrients are at a concentration of 0.2% to 1.8% (nutrients/liquid extract-formaldehyde mixture) (wt/wt);

v. Agitating the liquid extract-formaldehyde-nutrient mixture for a period of from 6 to 12 hours;

vi. Adding to the contents of said first blend tank about 33⅓-gallons of an oxygen-containing component to achieve a concentration of 2–10% (vol/vol) with the liquid extract-formaldehyde-nutrient mixture, wherein said oxygen containing component being prepared by the steps of: (i) adding about 5-gallons of distilled water to a container; (ii) adding 50 to 200 oz. of a 37% hydrogen peroxide solution into the distilled water to achieve a final concentration of 1.0 to 5.0% (vol/vol); (iii) adding about 5.0 to 50.0 grams of potassium stannate as a stabilizer into the water-peroxide solution; (iv) adding about 1,500-ml of the above concentrated oxygen-containing mixture to 1,000-gal of distilled water to achieve a final solution of the oxygen-containing component with a concentration of about 20 ppm dissolved oxygen;

vii. Agitating the then existing mixture in the first blend tank for approximately 1 to 2 hours;

viii. Adding to the first blend tank about 9-pounds of an antifungal compound selected from the group consisting of potassium sorbate, sodium propionate, sodium formate, propionic acid, and formic acid to achieve a concentration of between 0.05% to 0.30% (wt/wt);

ix. Agitating the then existing mixture in the first blend tank for a period of about 4 hours;

x. Transferring about 333⅓-gallons of said then existing mixture from steps (a)(i)–(ix) into a second blend tank;

xi. Adding about 333⅓-gallons of a liquid extract of a peat-bacteria-antifungal mixture to the second blend tank prepared by the process comprising the steps of (i) adding about 200 to 500-pounds of peat in a preparation tank; (ii) adding about 1,000-gallons of water to the preparation tank to achieve a concentration of between 8.0 to 58.0% of humic acid; (iii) heating the contents of said preparation tank to about 100° F.; (iv) agitating the peat mixture in said preparation tank for a period of about 24 hours; (v) adding a bacteria-containing component comprising a mixture of aerobic and facultative bacteria to achieve a concentration of between 0.02% to 0.40% bacteria concentration; (vi) adding an antifungal compound selected from the group consisting of potassium sorbate, sodium propionate, sodium formate, propionic acid, and formic acid to achieve a concentration of between 0.05% to 0.30% (wt/wt) of the antifungal compound to the peat-bacteria mixture; (vii) agitating the peat-bacteria-antifungal mixture at about 100° F. for about 24 hours; and (viii) extracting the peat-bacteria-antifungal mixture through a 60-mesh shaker screen;

xii. Adding to the second blend tank about 333⅓-gallons of an oxygen-containing component obtained by the process in step (a)(vi) above;

xiii. Adding a lactobacillus/aloe mixture consisting of about 125-ml of a concentrated solution of lactobacillus acidophilus, about 50-gallons of a 1:1 concentrate of aloe and an antifungal compound selected from the group consisting of potassium sorbate, sodium propionate, sodium formate, propionic acid, and formic acid to achieve a concentration of between 0.05% to 0.30% (wt/wt); and b. Applying said composition to said wastewater in a quantity sufficient to substantially reduce the BOD, TSS, Ammonia and total phosphorus contained therein.

12. The process of claim 11 wherein the nutrients of the 12¾-gallons of said micro-nutrient based component are at a concentration of 1.2% (wt/wt).

13. The process of claim 11 wherein the oxygen-containing component is added to achieve a concentration of 5% (vol/vol) with the liquid extract-formaldehyde-nutrient mixture.

14. The process of claim 11 wherein said 37% hydrogen peroxide solution is added to said distilled water to achieve a final concentration of 2.5% (vol/vol).

15. The process of claim 11 wherein 10.0 grams of said potassium stannate is added into said water-peroxide solution.

16. The process of claim 11 wherein said antifungal compound is added to said first blend tank to achieve a concentration of 0.20% (wt/wt).

17. The process of claim 11 wherein said peat-bacteria-antifungal mixture is made by adding 300 pounds of peat to said preparation tank.

18. The process of claim 11 wherein water is added to said preparation tank in the preparation of the peat-bacteria-antifungal mixture so that the concentration of humic acid is between 20.0 to 30.0%.

19. The process of claim 11 wherein the concentration of said antifungal compound is at 0.20% (wt/wt) of the antifungal compound to said peat-bacteria mixture.

20. The process of claim 11 wherein the concentration of said lactobacillus/aloe mixture is at 0.20% (wt/wt).

21. A method of treating wastewater comprising the steps:
a. making up a liquid waste treating composition containing:
i. a processed seaweed base, to which is added a formaldehyde solution;
ii. a micro-nutrient component having manganese sulfate, copper sulfate, iron sulfate, zinc sulfate, sodium borate, sodium molybdate, citric acid, and water;
iii. an oxygen-containing component consisting of hydrogen peroxide, potassium stannate, and distilled water;
iv. an antifungal compound selected from the group consisting of potassium sorbate, sodium propionate, sodium formate, propionic acid, and formic acid;
V. a humic acid additive comprising peat, humic acid, and a mixture of aerobic and facultative bacteria; and
vi. a lactobacillus/aloe mixture made up of a concentrated solution of lactobacillus acidophilus and concentrated aloe; and
b. treating the wastewater with said composition.

22. A liquid waste treating composition comprising:
a. processed seaweed base, to which is added a formaldehyde solution;
b. a micro-nutrient component having manganese sulfate, copper sulfate, iron sulfate, zinc sulfate, sodium borate, sodium molybdate, citric acid, and water;
c. an oxygen-containing component consisting of hydrogen peroxide, potassium stannate, and distilled water;
d. an antifungal compound selected from the group consisting of potassium sorbate, sodium propionate, sodium formate, propionic acid, and formic acid;
e. a humic acid additive comprising peat, humic acid, and a mixture of aerobic and facultative bacteria; and
f. a lactobacillus/aloe mixture made up of a concentrated solution of lactobacillus acidophilus and concentrated aloe.

* * * * *